US012663068B2

(12) United States Patent
Wu

(10) Patent No.: US 12,663,068 B2
(45) Date of Patent: Jun. 23, 2026

(54) TRANSMISSION WITH HOUSING PARTS, FOR EXAMPLE, TWO IDENTICALLY CONFIGURED HOUSING PARTS

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/860,771

(22) PCT Filed: Apr. 13, 2023

(86) PCT No.: PCT/EP2023/025174
§ 371 (c)(1),
(2) Date: Oct. 28, 2024

(87) PCT Pub. No.: WO2023/208414
PCT Pub. Date: Nov. 2, 2023

(65) Prior Publication Data
US 2025/0297676 A1    Sep. 25, 2025

(30) Foreign Application Priority Data

Apr. 28, 2022    (CN) ........................ 202210469570.X
Jul. 4, 2022    (DE) ........................ 102022002401.2

(51) Int. Cl.
*F16H 57/04*        (2010.01)
*F16H 57/02*        (2012.01)
*F16H 57/025*        (2012.01)

(52) U.S. Cl.
CPC ....... *F16H 57/0415* (2013.01); *F16H 57/025* (2013.01); *F16H 57/0402* (2013.01); *F16H 57/0435* (2013.01)

(58) Field of Classification Search
CPC .... F16H 57/025; F16H 57/03; F16H 57/0402; F16H 57/0415; F16H 57/0416;
(Continued)

(56) References Cited

U.S. PATENT DOCUMENTS 4,872,502 A * 10/1989 Holzman ............ F16H 57/0415
                                                                165/47
5,012,861 A * 5/1991 Kunze ................ F16H 57/0412
                                                                165/47
(Continued)

FOREIGN PATENT DOCUMENTS

CN        103185125 A * 7/2013    ........... F16H 57/021
CN        111998059 A * 11/2020    ......... F16H 57/0416
(Continued)

OTHER PUBLICATIONS

International Search Report and Written Opinion issued in corresponding International Application No. PCT/EP2023/025174 dated Jun. 21, 2023, pp. 1-3, English Translation.
(Continued)

*Primary Examiner* — Adam D Rogers
(74) *Attorney, Agent, or Firm* — Carter, DeLuca & Farrell LLP

(57)        ABSTRACT

A transmission includes two identically configured housing parts. The two housing parts are connected together, and cooling ribs are provided on each housing part. Foot plates are held by webs which are connected to each housing part, e.g., in a welded manner, and each web surrounds cooling ribs.

24 Claims, 7 Drawing Sheets

(58) Field of Classification Search
CPC ....... F16H 57/0435; F16H 2057/02073; F16H
2057/02095
See application file for complete search history.

(56) References Cited

U.S. PATENT DOCUMENTS

| | | | | |
|---|---|---|---|---|
| 8,555,747 | B2 | 10/2013 | Kant | |
| 8,833,193 | B2 * | 9/2014 | Strau | F16H 57/0447 |
| | | | | 184/6.12 |
| 8,967,334 | B2 * | 3/2015 | Strau | F16H 57/0447 |
| | | | | 184/6.12 |
| 8,973,458 | B2 * | 3/2015 | Strau | F16C 33/664 |
| | | | | 184/6.12 |
| 9,062,754 | B2 * | 6/2015 | Strau | F16H 57/0447 |
| 9,227,225 | B2 * | 1/2016 | Evarts | F16H 57/0415 |
| 9,366,332 | B2 * | 6/2016 | Hayashi | F16H 57/0416 |
| 9,756,759 | B2 * | 9/2017 | Kimura | F16H 57/0416 |
| 9,784,361 | B2 | 10/2017 | Wu | |
| 10,364,879 | B2 * | 7/2019 | Wu | F16H 57/03 |
| 10,941,850 | B2 * | 3/2021 | Wu | F16H 57/03 |
| 11,649,891 | B2 * | 5/2023 | Becka | F16H 57/0423 |
| | | | | 74/606 A |
| 11,885,406 | B2 * | 1/2024 | Völker | F16H 57/0416 |

FOREIGN PATENT DOCUMENTS

| | | | | | |
|---|---|---|---|---|---|
| CN | 212744987 | U | | 3/2021 | |
| CN | 119084540 | A | * | 12/2024 | ........... B66B 11/043 |
| CN | 120548426 | A | * | 8/2025 | ......... F16H 57/0495 |
| DE | 818716 | C | | 10/1951 | |
| DE | 102004030180 | A1 | | 2/2006 | |
| DE | 102008004337 | A1 | | 10/2008 | |
| DE | 102013018709 | A1 | | 5/2015 | |
| DE | 102013000518 | B4 | | 9/2021 | |
| WO | WO-2008125219 | A1 | * | 10/2008 | ........... F16H 57/033 |
| WO | WO-2010108602 | A2 | * | 9/2010 | ........... F16H 57/021 |
| WO | WO-2021254657 | A1 | * | 12/2021 | ......... F16H 57/0415 |

OTHER PUBLICATIONS

International Report on Patentability issued in corresponding International Application No. PCT/EP2023/025174, dated Oct. 19, 2024, pp. 1-10, English Translation.

* cited by examiner

TRANSMISSION WITH HOUSING PARTS, FOR EXAMPLE, TWO IDENTICALLY CONFIGURED HOUSING PARTS

FIELD OF THE INVENTION

The present invention relates to a transmission with housing parts, e.g., two identically configured housing parts.

BACKGROUND INFORMATION

In certain conventional systems, a transmission has a housing.

A transmission housing is described in Chinese Patent Document No. 11998059.

A housing for a transmission is described in German Patent Document No. 10 2013 018 709.

A transmission with a housing is described in German Patent Document No. 10 2013 000 518.

A housing for a transmission is described in German Patent Document No. 10 2008 004 337.

A spur gear is described in German Patent Document No. 10 2004 030 180.

BACKGROUND INFORMATION

Example embodiments of the present invention provide a transmission with a housing, in which the housing is compact, inexpensive, and readily produceable and in which the transmission is operable in different orientations.

According to example embodiments, a transmission includes housing parts, e.g., two identically configured housing parts, which are connected together, and cooling ribs are provided on each housing part. Foot plates, e.g., for setting up the transmission on a, e.g., flat floor surface, are held by webs which are connected to a respective housing part, e.g., in a welded manner. Each web surrounds cooling ribs, e.g., those which project between the housing part and the web. For example, the foot plates are spaced apart from the housing part. For example, the foot plates are connected to the webs in a welded manner.

An advantage of this is that the foot plates are spaced apart from the housing part by the webs, allowing a flow of cooling air to be passed between the housing part, the floor region, and the webs. The heat can thus be efficiently dissipated from the transmission, providing for high performance in a small installation space, i.e., a compact configuration of the transmission. By using two identical, i.e., always equal, housing parts, a plurality of such housing parts can be mass-produced, thus reducing costs. Production is also very simple, as only two identical housing parts need to be connected together to produce the transmission housing.

As the two housing parts are identical to each other, a different orientation of the transmission is possible by inverting the housing, i.e., turning it by 180° so that the upper housing part acts as the lower housing part and the lower housing part acts as the upper housing part. In both orientations, however, the transmission works as intended. For example, the oil circuit is also functional in that the shaft end pump sucks oil from the oil sump and presses it through an oil filter, after which it is fed into the interior. The piping is configured such that operation can be carried out undisturbed even with inversion.

According to example embodiments, each web is U-shaped and/or has two leg regions spaced apart from each other and respectively connected to a yoke of the web. For example, a first leg region of the respective web is connected to the respective housing part, and the other leg region of the respective web is connected to a respective foot plate. An advantage of this is that the webs act as connecting regions and the yoke as a spacing region. In this manner, the housing part is spaced from the floor region, allowing a cooling air flow to be passed underneath the housing part.

According to example embodiments, the cooling ribs are arranged between the respective yoke and the respective housing part. For example, the yoke is spaced from the housing part. An advantage of this is that the cooling air flow between the cooling ribs can be passed underneath the yoke or web as seen from the housing part.

According to example embodiments, the webs are spaced apart and are arranged one behind the other along a straight line. An advantage of this is that the cooling air flow can be passed underneath the webs as seen from the housing part, e.g., in a direction parallel to the direction of the axis of rotation of the input shaft.

According to example embodiments, the webs arranged one behind the other along the straight line are identically configured with the exception of a first web, on which an eyelet is additionally formed, and a second web, on which an eyelet is additionally formed. An advantage of this is that transport can be readily carried out. The eyelet can also be used during assembly and simplifies assembly.

According to example embodiments, half of the bearing mounts of the transmission are formed in the first housing part, and the respective other half of the bearing mounts are formed in the second housing part. The bearing mounts have a greater, e.g., at least five times greater wall thickness than the wall of the remaining housing part. An advantage of this is that the bearing mounts are split, i.e., they can be arranged half in each of the parts rather than in a single part.

According to example embodiments, the first leg of the respective web is connected to a bearing mount, and the other leg of the respective web is connected to one of the foot plates of the transmission. An advantage of this is that the foot plates are spaced apart from the housing part, allowing a flow of cooling air to be passed between them.

According to example embodiments, the contact surface of the two housing parts is contained in a parting plane, e.g., a split plane, and the foot plates are each aligned parallel to the parting plane of the transmission. An advantage of this is that the parting plane bisects the bearing mounts, thus creating a single interface between the two housing parts.

According to example embodiments, each housing part is connected to two foot plates. An advantage of this is that the transmission can be set up stably.

According to example embodiments, the first and/or input gear stage of the transmission is an angular gear stage, and the cooling ribs are aligned parallel to the axis of rotation of the input shaft of the transmission, e.g., the angular gear stage. For example, the input shaft is aligned perpendicular to the output shaft of the transmission. An advantage of this is that a fan can be driven by the input shaft, which fan conveys an air flow along the cooling ribs parallel to the axis of rotation of the input shaft.

According to example embodiments, a shaft end pump is arranged on a shaft of the transmission, e.g., on an intermediate shaft of the transmission, and is driven by the shaft. The shaft end pump is connected to a multi-port valve, e.g., a three-way valve or two-way valve. A first connection of the shaft end pump is optionally connected via the multi-port valve, e.g., depending on the switching state of the multi-port valve, to a first oil pipe which opens into a bore passing through the wall of the first housing part, or is connected to a second oil pipe which opens into a bore passing through the wall of the second housing part, e.g., so that the oil can be sucked in by the shaft end pump from the oil sump of the transmission, e.g., when the multi-port valve is in the corresponding switching state.

An advantage of this is that the shaft end pump sucks oil from the oil sump, and the transmission is set up in the first or second orientation, i.e., either with the first housing part as the lower housing part or alternatively with the second housing part as the lower housing part.

According to example embodiments, the second connection of the shaft end pump is connected to an oil filter via an oil line, from which oil filter a further oil line leads to a bore passing through the first housing part. For example, the first connection of the shaft end pump is connected to the second connection of the shaft end pump via a safety valve, e.g., a pressure relief valve. An advantage of this is that oil is filtered. In addition, the oil filter is located on the outside of the transmission so that the oil is cooled.

According to example embodiments, a fan is connected to the input shaft, and a fan cover is connected to the two housing parts and at least partially encloses the fan to form the housing. For example, the air flow conveyed by the fan is passed along the cooling ribs. An advantage of this is that a passively driven fan can be used, and, thus, a stronger cooling air flow can be generated at high speed.

According to example embodiments, at least two foot plates spaced apart from each other are arranged on a respective one of the housing parts. For example, the foot plates connected to the respective housing part are aligned parallel to each other. An advantage of this is that a foot plate can be provided on each long side of the housing part. Thus, a stable configuration is possible.

According to example embodiments, either the first housing part is arranged below the second housing part in the direction of gravity and/or the first housing part is arranged with its foot surfaces on a floor surface, or the second housing part is arranged below the first housing part in the direction of gravity and/or the second housing part is arranged with its foot surfaces on a floor surface. An advantage of this is that the transmission can be arranged in two orientations.

Further features and aspects of example embodiments of the present invention are explained in more detail below with reference to the appended schematic Figures.

DETAILED DESCRIPTION

As schematically illustrated in the Figures, the transmission has a housing made up of two identically configured housing parts 1.

Figure 1:
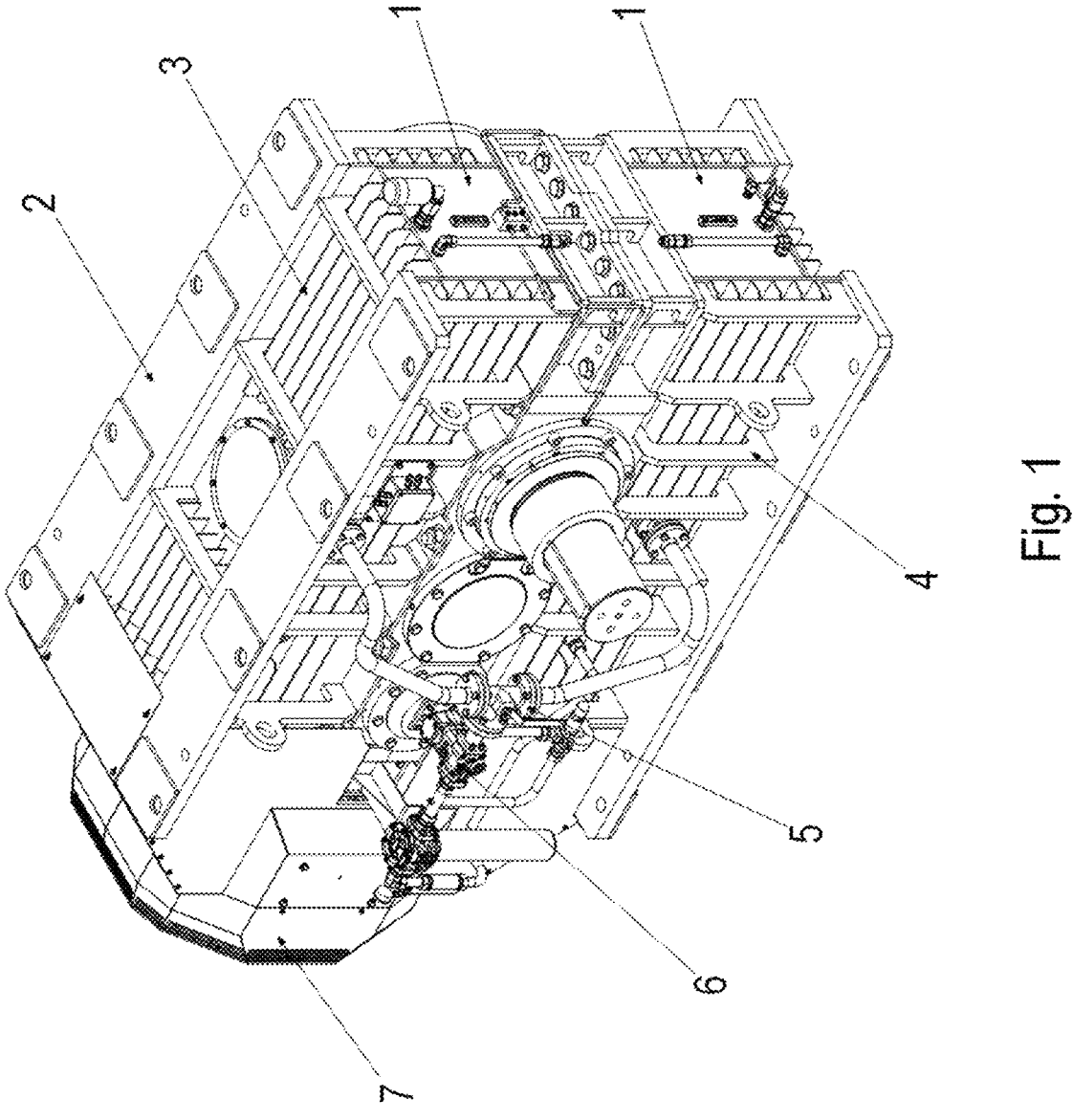
FIG. 1 is a perspective view of a transmission.
Figure 2:
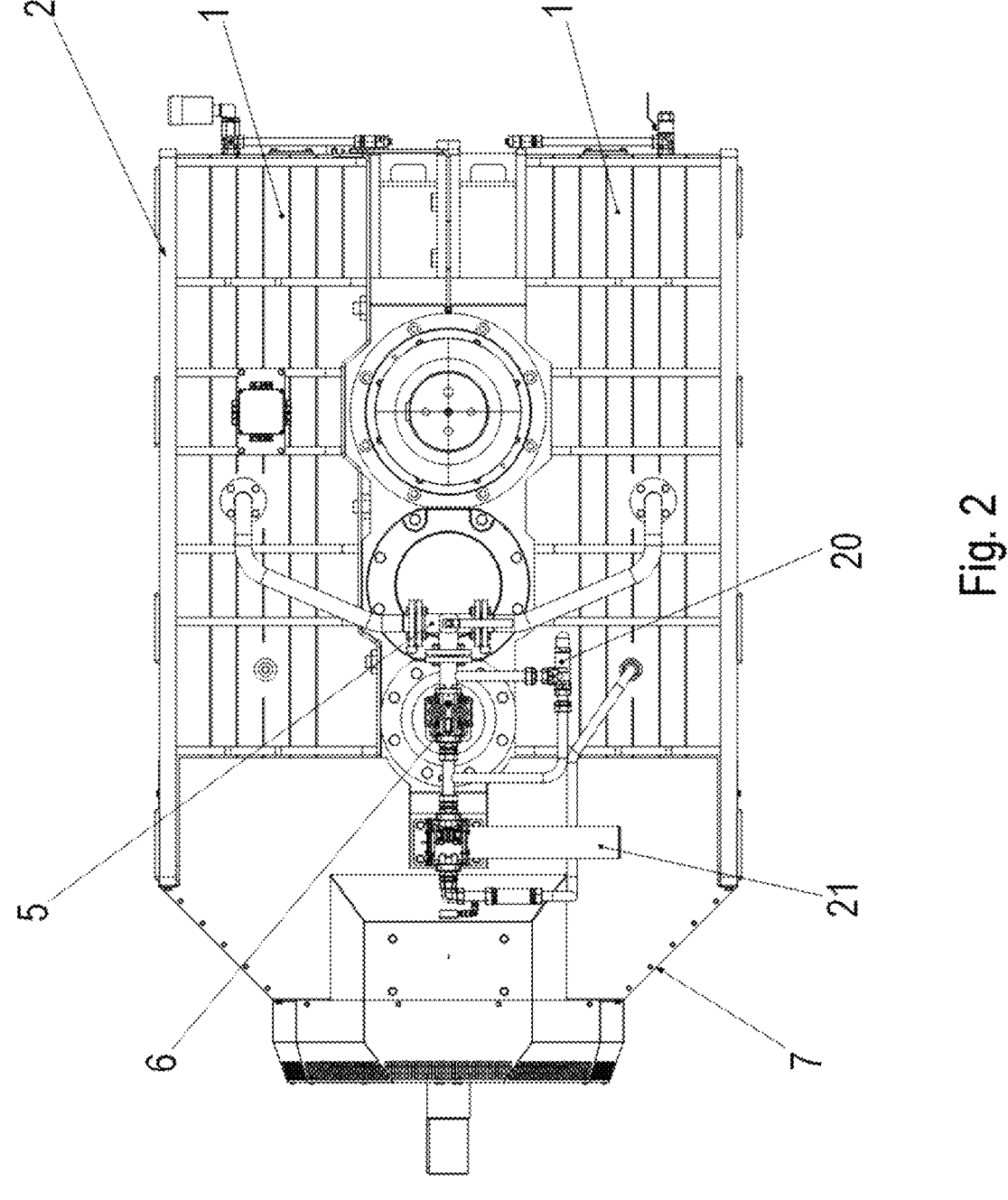
FIG. 2 is a side view of the transmission.
Figure 3:
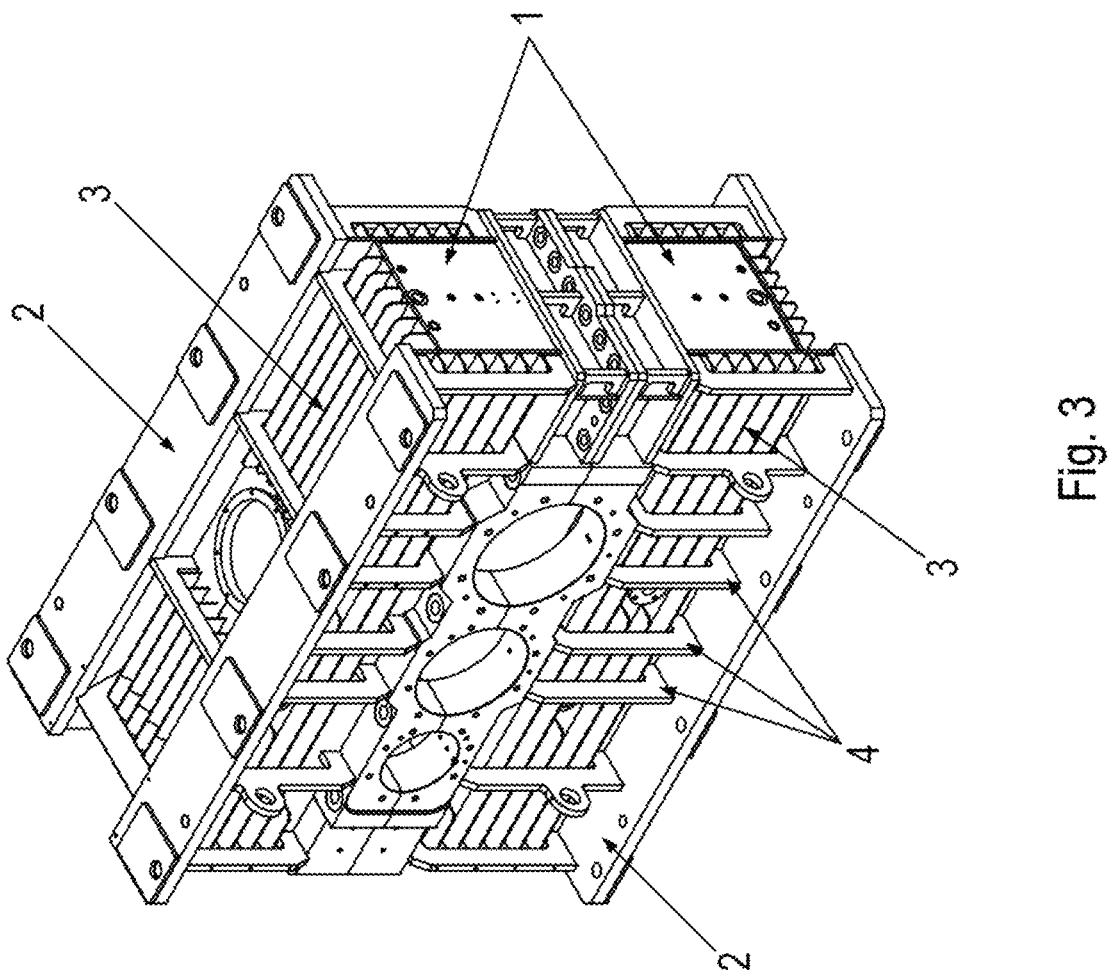
FIG. 3 is a perspective view of the transmission housing from a first viewing direction.
Figure 4:
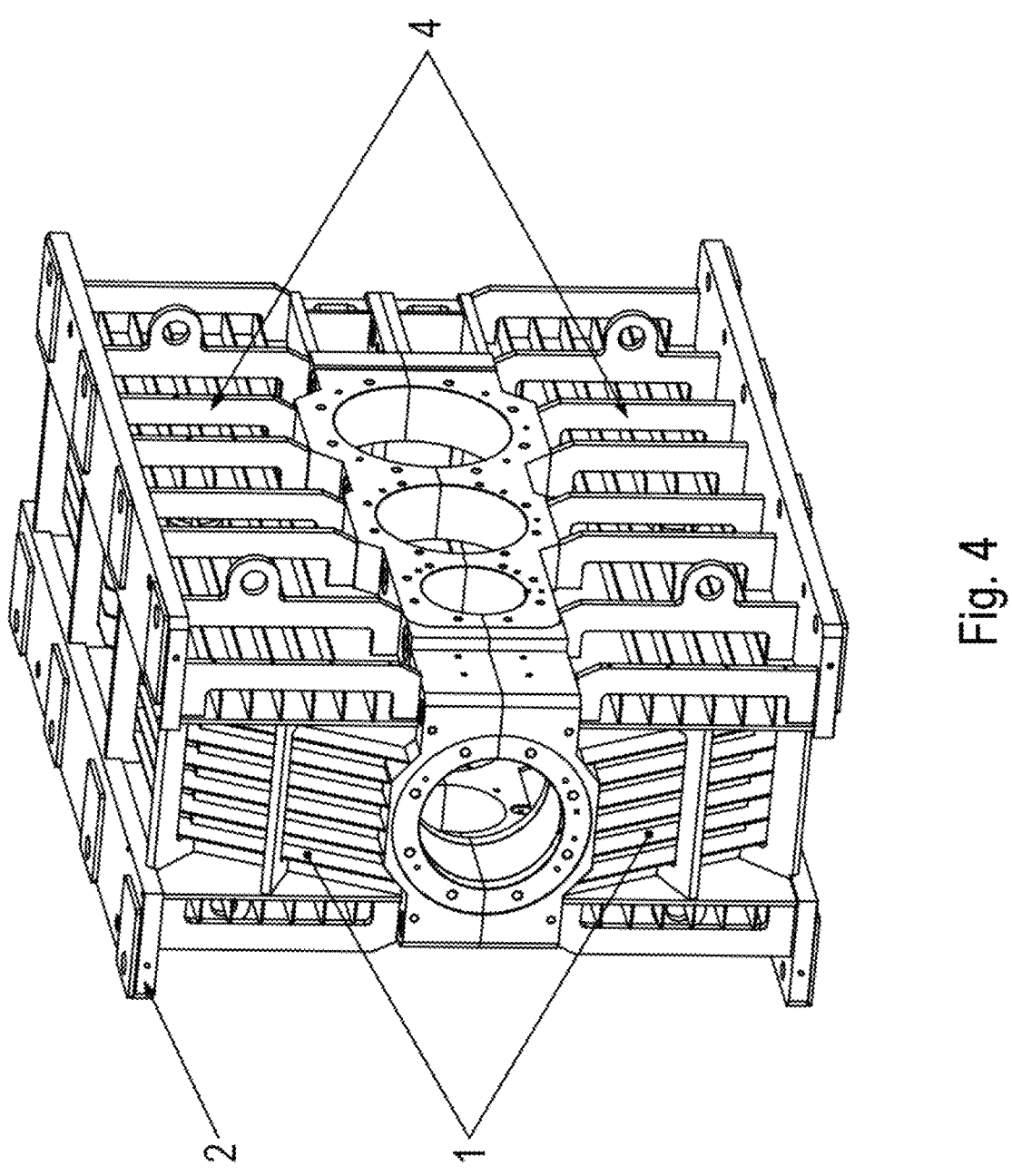
FIG. 4 illustrates the housing from a different viewing direction, in contrast to FIG. 3.
Figure 5:
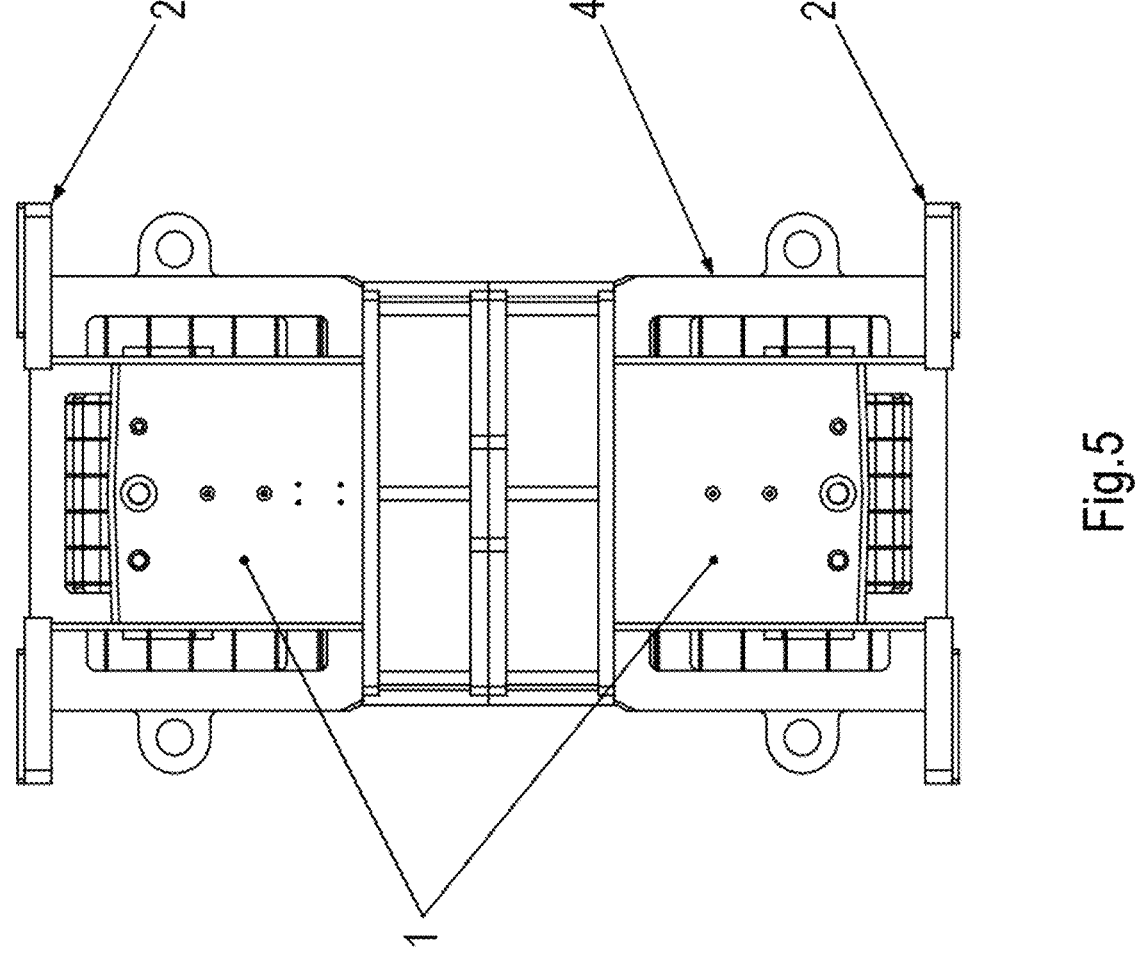
FIG. 5 is a front view of the transmission.
Figure 6:
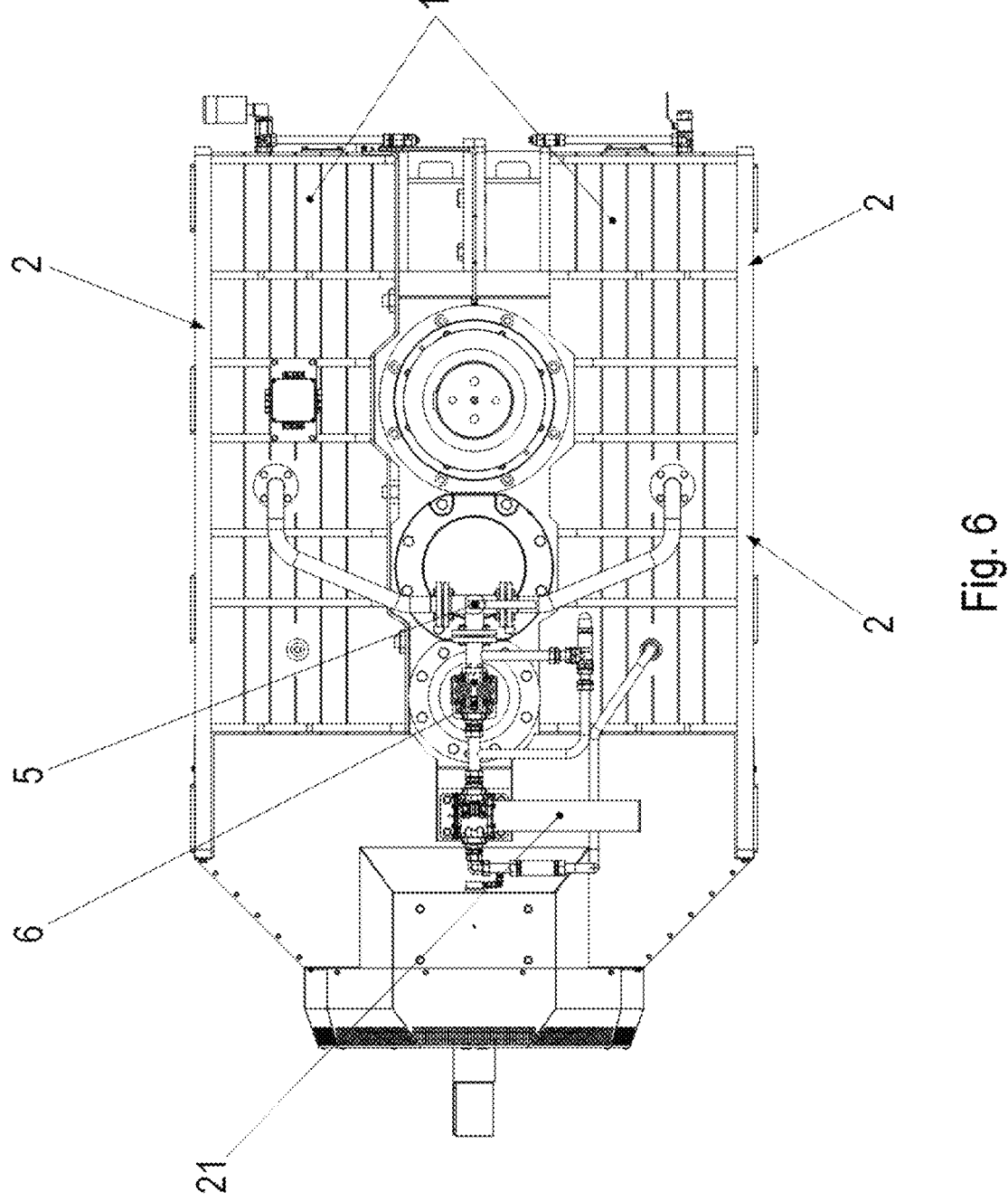
FIG. 6 is another side view of the transmission.
Figure 7:
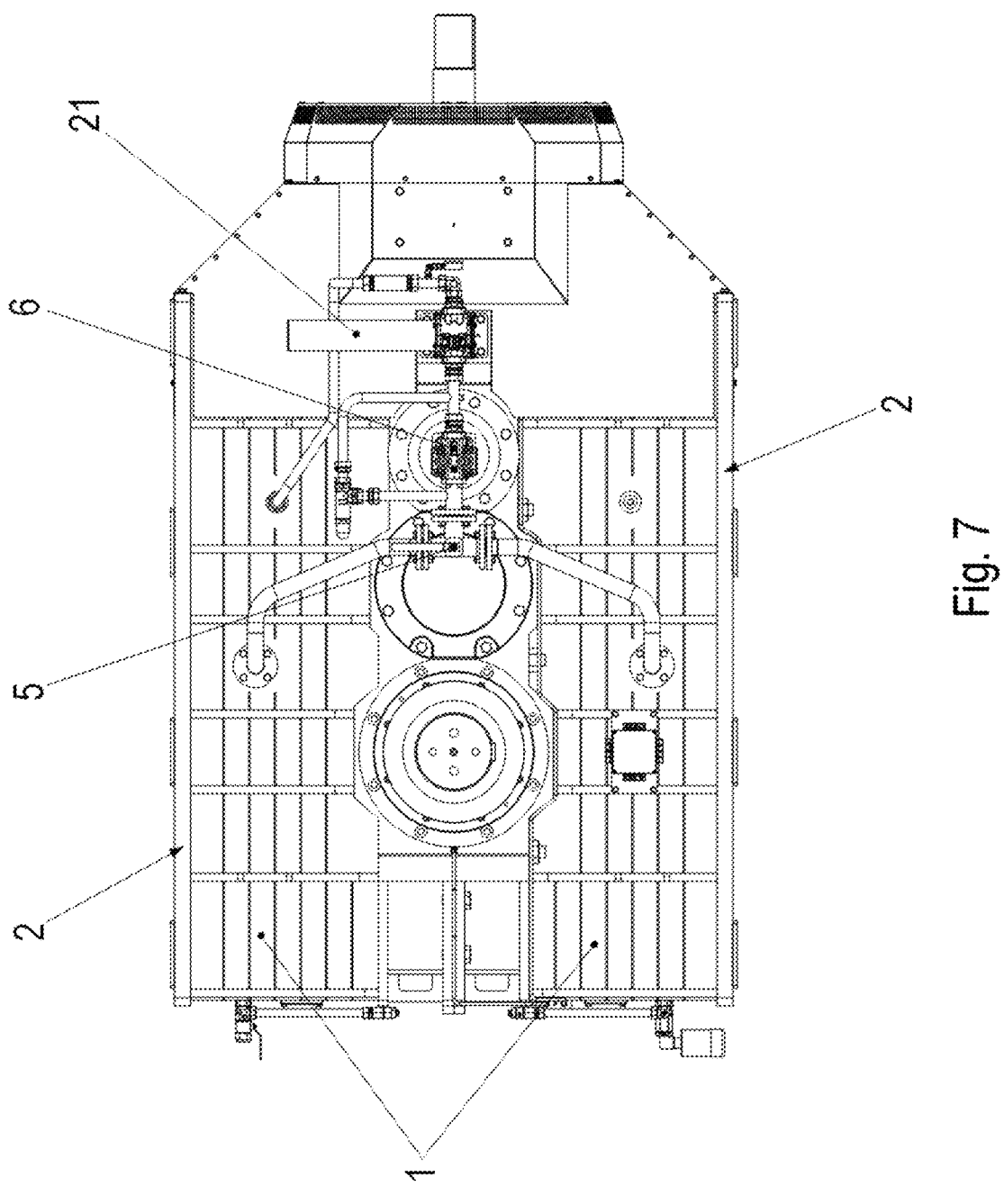
FIG. 7 is a side view of an inverted transmission, i.e., rotated by 180°.

Thus, as can readily be seen by comparing FIGS. 6 and 7, the transmission can be inverted on the floor, i.e., rotated by 180°. This is because each of the two housing parts 1 is connected to a foot plate 2, by which the transmission can be arranged on the floor.

Each of the housing parts 1 is formed with cooling ribs 3 on its outside.

Webs 4, which surround the cooling ribs, are connected both to the respective housing part 1 and to the foot plate 2 of the respective housing part 1.

The housing thus is arranged as a split housing.

The second of the two housing parts 1 is placed on the first of the two housing parts 1, so that the mutual contact surface of the two housing parts 1 is contained in the split plane.

The bearing mounts for receiving rolling bearings for the shafts of the transmission, e.g., for the output shaft, at least one intermediate shaft and the input shaft of the transmission, are also divided by the split plane, e.g., in which the respective half of the bearing mount is arranged in the first housing part 1 and the other half is arranged in the other housing part 1.

The webs 4 are, for example, welded to a respective foot plate 2, on the one hand, and to the respective housing part 1, on the other.

The webs 4 surround the cooling ribs 3 such that the respective cooling ribs 3 are arranged between the respective webs 4 and the respective housing part.

The cooling ribs 3 surrounded by the respective web 4 are spaced apart and arranged parallel to each other. The cooling channels formed between the cooling ribs 3 thus pass between the respective web 4 and the respective housing part 1.

The webs 4 are arranged one behind the other along a straight line on a respective side of the respective housing part 1.

For example, the webs 4 are identically configured, however, along the line, a first of the webs 4 additionally has an outwardly projecting eyelet, and a last of the webs 4 also has an outwardly projecting eyelet.

The foot parts project above the housing part towards the floor by the webs 4. This is because the respective webs 4 are attached to the respective housing part 1 and hold the respective foot plate 2.

In addition, cooling ribs are also formed on the side of the housing part 1 facing the floor, which cooling ribs are spaced apart and extend parallel, e.g., perpendicular to the direction of the axis of rotation of the output shaft of the transmission.

The spacing of the foot plates 2 from the housing part 1 allows an air flow routed by the ribs to be passed between the floor, e.g., the floor surface of the floor, which is as flat as possible, and the housing part 1.

The transmission housing that includes the two housing parts 1 thus has cooling ribs 3 on almost all sides. This ensures improved heat dissipation.

As described above, an air flow can be routed along all sides of the transmission housing parallel to the axis of rotation of the input shaft and flows between the cooling ribs 3.

The foot plates 2 of the housing part 1, which are arranged on the side of the housing part 1 facing away from the floor, are arranged as additional cooling fins or cooling ribs, as they also increase the surface area.

The wall thickness of the respective housing part 1 in the region of the bearing mounts is greater, e.g., at least five times greater, than the wall thickness of the housing part 1 in the region of the housing part 1 in which the cooling ribs are arranged.

These regions of the bearing mounts project into the surroundings, e.g., due to the thickened wall thickness, especially beyond the cooling ribs 4.

The webs 4 are attached, e.g., welded, to these regions of the bearing mounts. For example, the webs 4 thus also project beyond the cooling ribs into the surroundings.

Each web 4 is U-shaped or at least has a U-shaped basic structure.

The axis of rotation of the input shaft is aligned perpendicular to the axis of rotation of the output shaft. The first gear stage is thus arranged as an angular gear stage, and the other gear stages are parallel shaft gear stages, e.g., spur gear stages.

The respective housing part 1 is beveled in the region of the first gear stage. Thus, the first gear stage is, for example, arranged as a bevel gear stage.

The bevel on the front of the housing part 1 is configured such that the housing part has a, e.g., strictly monotonically decreasing distance from the front of the bearing mount for the bearing of the input shaft with decreasing distance to the foot plates 2.

A shaft end pump is arranged on the first intermediate shaft of the transmission, i.e., on the output shaft of the first transmission stage.

The oil flow delivered by the shaft end pump is routed through an oil filter 21 and from there back into the oil sump of the transmission.

The shaft end pump 6 and the oil filter are mounted on the outside of the transmission and/or are accessible from the outside environment.

The oil line required for this from the shaft end pump to the oil filter 21 is attached to the outside of the transmission. The oil line from the oil filter back to the oil sump is also attached to the outside and opens into a bore passing through the housing part 1.

As illustrated in FIG. 6, a multi-port valve, e.g., a three-way valve, is attached to the outside of the transmission, so that the suction side of the shaft end pump 6 is optionally connected to a first oil pipe, which opens into a bore passing through the wall of the first housing part, or is connected to a second oil pipe, which opens into a bore passing through the wall of the second housing part. This means that the oil can be sucked in from the oil sump by the shaft end pump, and the multi-port valve must be set accordingly.

However, as illustrated in FIG. 7, the transmission can also be operated when it is rotated by 180°, i.e., for example, when it is turned upside down. This is because in this case the multi-port valve 5 only needs to be switched so that oil from the oil sump now located in the other housing part 1 can be sucked in by the shaft end pump.

In the example embodiment illustrated in FIG. 7, the oil conveyed through the oil filter 21 is fed into the interior through a hole in the upper housing part 1.

A fan is connected for conjoint rotation to the input shaft. An air routing cover 7 directs the air flow conveyed by the fan along the cooling ribs 3, so that an air flow moves along all four sides of the substantially cuboid housing part 1.

The fan cover 7 is, for example, connected to both housing parts 1 and covers the beveled regions.

For example, the oil pipes and oil lines are located in the air flow conveyed by the fan, so that the oil conveyed by the shaft end pump is also cooled.

For example, the suction side of the shaft end pump is connected to the pressure side of the shaft end pump 6 via a safety valve 20, e.g., a pressure relief valve.

In further example embodiments, the shaft end pump in FIG. 6 is operated in reverse, so that the oil is sucked from the oil sump of the first housing part 1, i.e., the lower housing part 1, and fed to the shaft end pump through the oil filter 21. The oil conveyed by the shaft end pump is fed to the other housing part 1 in that the oil pipe leads from the multi-port valve 5 to the bore of the upper housing part 1. For example, oil lines are arranged in the interior of the transmission, which oil lines route the oil supplied through the bore to lubrication points, e.g., bearings and gears. The oil thus flows by gravitational force to the lubrication points.

In the example embodiment illustrated shown in FIG. 7, i.e., with the transmission turned upside down compared to FIG. 6, the shaft end pump is operated in the same manner and the oil routing remains the same as in FIG. 6.

LIST OF REFERENCE NUMERALS

1 Housing part
2 Foot plate
3 Cooling ribs
4 Web
5 Multi-port valve
6 Shaft end pump
7 Air routing cover
20 Safety valve, e.g., pressure relief valve
21 Oil filter

The invention claimed is:

1. A transmission, comprising:

two housing parts connected together, cooling ribs being formed on each housing part; and foot plates held by webs connected to each housing part, each web surrounding respective cooling ribs.

2. The transmission according to claim 1, wherein the two housing parts are identical.

3. The transmission according to claim 1, wherein the foot plates are adapted to contact a flat floor surface, each of the webs is welded to one of the housing parts, the cooling ribs project between the housing part and the webs, the foot plates are spaced apart from the housing part, and the foot plates are welded to the webs.

4. The transmission according to claim 1, wherein each web is U-shaped and/or includes two leg regions spaced apart from each other and respectively connected to a yoke of the web.

5. The transmission according to claim 4, wherein a first leg region of each of the webs is connected to one of the housing parts, and a second leg region of each of the webs is connected to one of the foot plates.

6. The transmission according to claim 4, wherein each of the cooling ribs is arranged between the yoke of a plurality of the webs and a respective one of the housing parts.

7. The transmission according to claim 6, wherein each yoke is spaced from the respective one of the housing parts.

8. The transmission according to claim 4, wherein a first leg of at least one of the webs is connected to a bearing mount and a second leg of the at least one web is connected to one of the foot plates of the transmission.

9. The transmission according to claim 1, wherein the webs are spaced apart and arranged one behind the other along a straight line.

10. The transmission according to claim 9, wherein the webs arranged one behind the other along the straight line are identical except for a first web, on which an eyelet is arranged, and a second web, on which an eyelet is arranged.

11. The transmission according to claim 1, wherein half of bearing mounts of the transmission are arranged in a first one of the housing parts and a respective other half of the bearing mounts are formed in a second one of the housing parts, the bearing mounts have a greater wall thickness than a wall of a remaining part of each housing part.

12. The transmission according to claim 11, wherein the wall thickness of the bearing mounts is at least five time greater than the wall thickness of the remaining housing part.

13. The transmission according to claim 1, wherein a contact surface of the two housing parts is contained in a parting plane, and the foot plates are each aligned parallel to the parting plane.

14. The transmission according to claim 1, wherein each housing part is connected to two of the foot plates.

15. The transmission according to claim 1, wherein a first and/or input gear stage of the transmission is arranged as an angular gear stage, and the cooling ribs are aligned parallel to an axis of rotation of an input shaft of the transmission.

16. The transmission according to claim 15, wherein the input shaft is aligned perpendicular to an output shaft of the transmission.

17. The transmission according to claim 1, wherein a shaft end pump is arranged on a shaft of the transmission and is adapted to be driven by the shaft, the shaft end pump is connected to a multi-port valve.

18. The transmission according to claim 17, wherein a first connection of the shaft end pump is connected via the multi-port valve to a first oil pipe which opens into a bore passing through a wall of a first one of the housing parts or is connected to a second oil pipe which opens into a bore passing through a wall of a second one of the housing parts.

19. The transmission according to claim 18, wherein a second connection of the shaft end pump is connected to an oil filter via an oil line, and a further oil line leads from the oil filter to a further bore passing through the first one of the housing parts.

20. The transmission according to claim 19, wherein the first connection of the shaft end pump is connected to the second connection of the shaft end pump via a safety valve and/or a pressure relief valve.

21. The transmission according to claim 1, wherein a fan is connected to an input shaft of the transmission, a fan cover is connected to the two housing parts and at least partially encloses the fan to form a housing.

22. The transmission according to claim 21, wherein the fan is adapted to convey an air flow along the cooling ribs.

23. The transmission according to claim 1, wherein at least two of the foot plates are spaced apart from each other and are arranged on a respective one of the housing parts, and the foot plates connected to the respective housing part are aligned parallel to each other.

24. The transmission according to claim 1, wherein either a first one of the housing parts is arranged below a second one of the housing parts in a direction of gravity and/or foot surfaces of the foot plates of the first one of the housing parts are arranged on a floor surface.

\* \* \* \* \*